United States Patent [19]

Arai

[11] 3,839,128
[45] Oct. 1, 1974

[54] APPARATUS FOR MANUFACTURING THERMOPLASTIC CONTAINERS HAVING THERMOPLASTIC CLOSURES

[75] Inventor: Shinroku Arai, Kanagawa-ken, Japan

[73] Assignee: Modern Package Co. Ltd., Kanagawa-ken, Japan

[22] Filed: Jan. 17, 1972

[21] Appl. No.: 218,342

Related U.S. Application Data

[62] Division of Ser. No. 856,287, Sept. 9, 1969, abandoned.

[52] U.S. Cl. ................. 156/583, 156/66, 93/8 R
[51] Int. Cl. .................. B30b 3/02, A41h 37/06
[58] Field of Search ........... 156/583, 251, 259, 303, 156/66, 244, 555, 582; 150/3; 229/66, 54; 93/8 R, 14; 24/201 C

[56] References Cited
UNITED STATES PATENTS

| | | | |
|---|---|---|---|
| 2,918,106 | 12/1959 | Fener | 156/583 X |
| 3,038,217 | 6/1962 | Harris | 156/259 X |
| 3,202,559 | 8/1965 | Laguerre | 156/66 |
| 3,507,194 | 4/1970 | Schwarzkopf | 229/54 X |
| 3,532,571 | 10/1970 | Ausnit | 150/3 X |
| 3,554,822 | 1/1971 | Schwarzkopf | 156/66 |

Primary Examiner—Douglas J. Drummond
Assistant Examiner—M. G. Wityshyn
Attorney, Agent, or Firm—Steinberg & Blake

[57] ABSTRACT

An apparatus for manufacturing containers from thermoplastic film with each container having at its mouth a thermoplastic closure in the form of a sliderless fastener. This latter fastener takes the form of a pair of thermoplastic strips having a tongue-and-groove connection therebetween. With this fastener in its closed condition film edge portions which subsequently form the mouth of the container are heat-sealed to the strips at outer surfaces thereof. The apparatus includes coplanar heat-resistant plates having parallel edges which define between themselves a gap for receiving projections of the strips which form the tongue-and-groove connection therebetween, and the heat sealing takes place by pressing the film edge portions against the strips of the closure while these strips have these heat-resistant plates situated therebetween. The film which forms the container initially is in the form of a tube, and a cutter cuts the tube longitudinally to provide the edges which subsequently form the mouth of the container.

6 Claims, 14 Drawing Figures

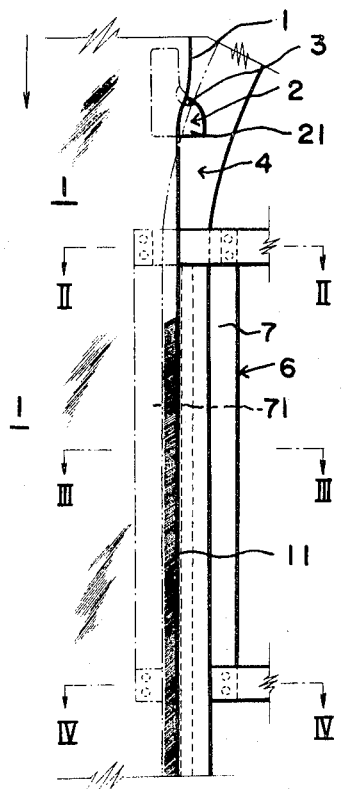
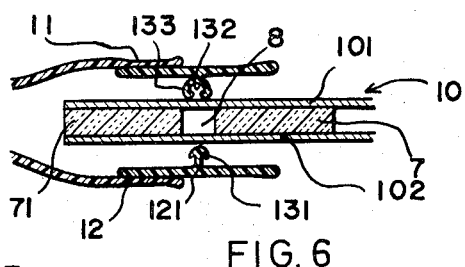
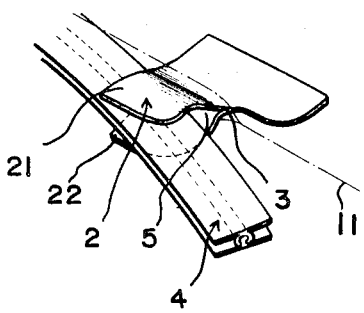
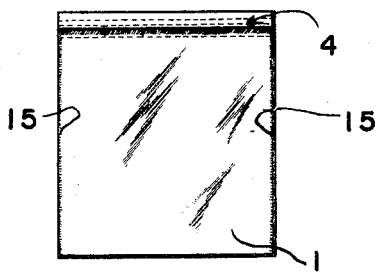

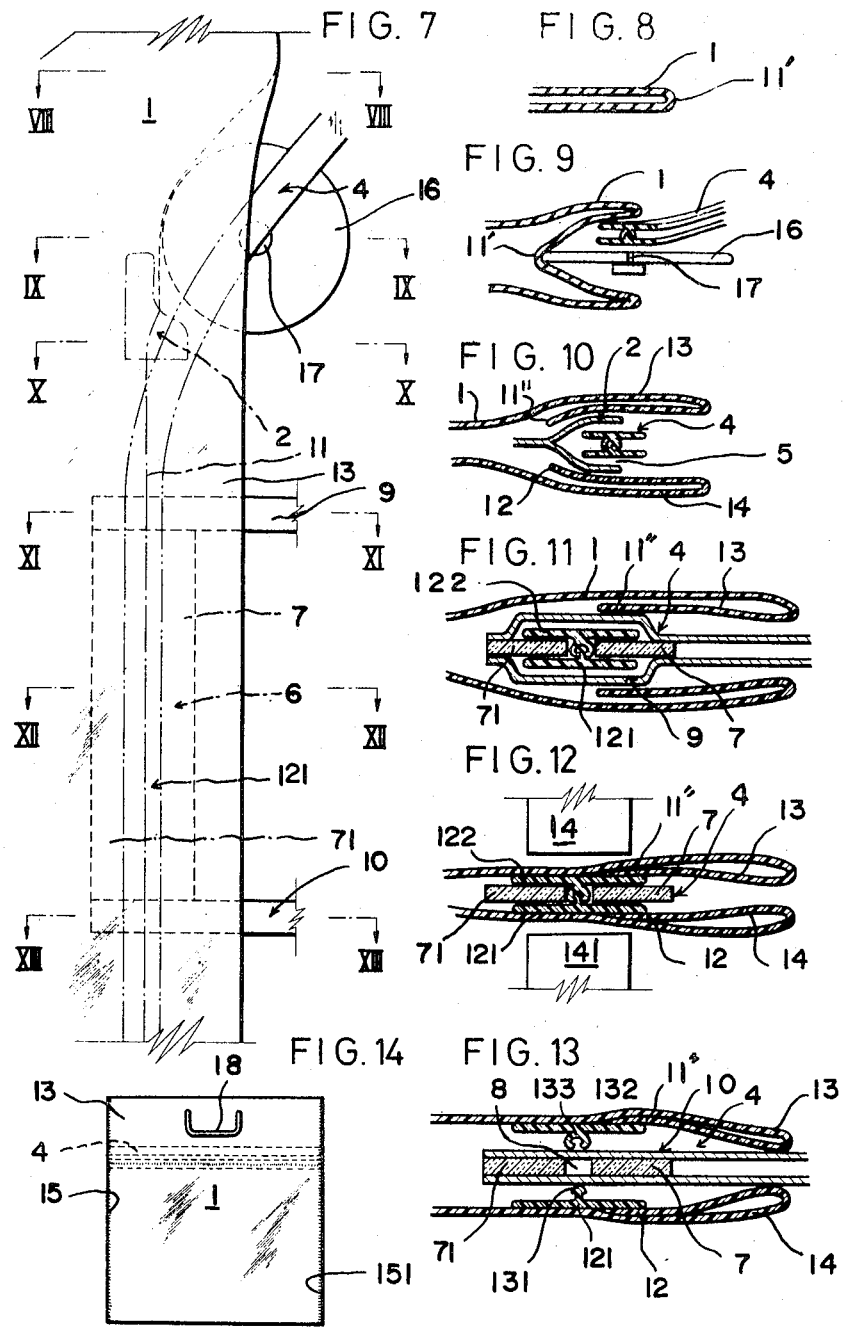

APPARATUS FOR MANUFACTURING THERMOPLASTIC CONTAINERS HAVING THERMOPLASTIC CLOSURES

CROSS REFERENCE TO RELATED APPLICATION

This application is a division of application Ser. No. 856,287, filed Sept. 9, 1969, and entitled METHOD AND APPARATUS FOR MANUFACTURING THERMOPLASTIC CONTAINERS HAVING THERMOPLASTIC CLOSURES, now abandoned.

BACKGROUND OF THE INVENTION

The present invention relates to containers.

In particular, the present invention relates to thermoplastic containers in the form of pouches, sacks, or the like, made of a flexible thermoplastic film. The invention relates particularly to a container of this type which has at its mouth a thermoplastic closure of the sliderless fastener type.

Containers of this general type are conventionally manufactured as by joining to opposed edges of a blank of thermoplastic film closure strips which subsequently are placed together when the blank is further treated to complete the container. While such a method, and the apparatus for performing it, are indeed simple, the containers achieved through such a conventional method and apparatus are generally of poor quality because the closure strips do not always coact properly because of improper positioning with respect to each other when the container is completed. Furthermore, in spite of the simplicity the cost of manufacturing containers of this type is relatively high as a result of the fact that each container is separately formed, so that it is not possible to make use of economies which can be derived from continuous manufacture of the containers while the components which form the same are in continuous movement.

There are also known methods and apparatus according to which a pair of plastic film sheets have the closure structure directly formed thereon, and then the pair of sheets are cut to the required size and joined along the sides and bottom of the container to complete the latter. With such an arrangement there is no particular limitation as to the width of the container, as determined by the size of the blanks in the above-described method in apparatus, but on the other hand the necessity of forming the closure directly in the film itself is of disadvantage and furthermore the closure of the sheets of film to each other along the bottom of the container provides the container with a weak construction precisely where great strength is required, namely at the bottom end of the container.

SUMMARY OF THE INVENTION

It is accordingly a primary object of the present invention to provide an apparatus which will avoid the above drawbacks.

In particular, it is an object of the invention to provide an apparatus which makes it possible to achieve thermoplastic containers each having at the mouth thereof a thermoplastic closure of the sliderless fastener type made up of components which are properly situated with respect to each other so as to provide the desired operation of the closure without any difficulty.

Furthermore, it is an object of the invention to provide an apparatus which makes it possible to maintain the components which form the container in continuous movement, so as to achieve a high output at a relatively low cost for each container.

In addition, it is an object of the invention to provide an apparatus which will result in a container which is particularly strong at the bottom thereof.

In this latter connection it is an object of the invention to provide an apparatus which does not require any separation between film layers at the location where the bottom of the container is situated.

Yet another object of the invention is to provide an apparatus which, if desired, can be used to provide a container which has a handle.

The apparatus of the invention includes a pair of heat-resistant plates located in common plane and having parallel edges spaced from and directed toward each other to define between themselves a gap for receiving projecting portions of the fastener strips which form the tongue-and-groove connection therebetween, so that these strips can engage outer surfaces of the heat-resistant plates while the closure is in its closed condition and during heat-sealing of the film edges to the outer surfaces of the strips.

BRIEF DESCRIPTION OF DRAWINGS

The invention is illustrated by way of example in the accompanying drawings which form part of this application and in which:

FIG. 1 is a fragmentary schematic longitudinal elevation showing the apparatus for cutting a tube of film while situating between film edges the strips which form the closure;

FIG. 2 is a fragmentary transverse section, at a scale larger than FIG. 1, taken along line II—II of FIG. 1 in the direction of the arrows and showing how the heat-resistant plates are mounted and how the work material coacts therewith;

FIG. 3 is a transverse sectional elevation taken along line III—III of FIG. 1 in the direction of the arrows at a scale larger than FIG. 1 and schematically illustrating the manner in which film edges are heat-sealed to the closure strips;

FIG. 4 is a fragmentary transverse section taken along line IV—IV of FIG. 1 in the direction of the arrows at an enlarged scale as compared to FIG. 1 and showing the manner in which the work material, subsequent to treatment as shown in FIG. 3, moves beyond a lower holding means which holds the heat-resistant plates together;

FIG. 5 is a fragmentary perspective illustration illustrating the manner in which cutting means of the invention coacts on the one hand with the film tube which is cut thereby and on the other hand with the closure which is directed to the space between the film edges formed by the cutting means showing in FIG. 5;

FIG. 6 shows in side elevation a completed container manufactured according to the apparatus illustrated in FIGS. 1-5;

FIG. 7 is a fragmentary longitudinal elevation showing another embodiment of an apparatus of the invention;

FIGS. 8–13 are respectively fragmentary sectional views taken along section lines VIII—VIII to XIII—XIII of FIG. 7 in the direction of the arrows and respectively showing in sequence, at an enlarged scale compared to FIG. 7, the various subsequent stages of the operation of the apparatus of the invention to achieve a container having a handle; and FIG. 14 is a view in elevation of the completed container formed with the apparatus of FIGS. 7–13.

DESCRIPTION OF PREFERRED EMBODIMENTS

Referring to FIG. 1, there is fragmentarily illustrated therein a tube of thermoplastic film 1 which is shown in FIG. 1 moving in the direction of the arrows at the top of FIG. 1 as this tube of plastic film issues from an extruder or the like in which the tube is formed.

As the tube of plastic film 1 advances in the direction of the arrows, downwardly as viewed in FIG. 1, it is moved past a cutting means 2 which cuts the one-piece tube so as to provide it with a pair of parallel edge portions 11 and 12 which subsequently define the mouth of the container. The cutting means is fixedly held in the position shown by any suitable bracket or the like. This cutting means is formed by a pair of metal sheet portions which, for example, may be formed of a single piece of metal sheet with the sheet portions joined to each other along the fold line situated at the left, as viewed in FIG. 1. These metal sheet portions are of substantially L-shaped configuration to form a corner 3 where the actual cutting of the film 1 takes place. Beyond the corner 3 in the direction of movement of the film 1, the plate portions of the cutter are curved away from each other to form the spaced guide portions 21, 22 shown in FIG. 5, and of course these spaced portions 21 and 22 of the cutting means will extend between the film edge portions 11 and 12.

The closure for the container is in the form of a thermoplastic sliderless fastener 4 composed of a pair of thermoplastic strips 121 and 122 respectively having inner faces directed toward each other and carrying projections which form a tongue-and-groove connection between the strips of the closure 4. Thus it will be seen, particularly from FIG. 4, that the strip 121 has an elongated projection 131 extending inwardly from its inner face and forming a tongue of the tongue-and-groove connection, this rib or projection 31 extending longitudinally along the strip 121 midway between the opposed edges thereof and having a substantially T-shaped cross section, as is apparent from FIG. 4. On the other hand, the strip 122 of the closure has an elongated projection 133 forming a channel or groove 132 for receiving the tongue 131. Thus when the latter is snapped into the channel 132 of the projection 133 the sliderless fastener 4, which subsequently forms the closure for the container, is in its closed condition where the strips are releasably fastened to each other with their inner faces situated at a given distance from each other. The thermoplastic which forms the strips of the fastener 4, of a springy yieldable nature enabling th projection 133 to resiliently grip the enlarged inner free edge portion of the tongue 131.

Beyond the cutting means 2 in the direction of movement of the plastic film 1 and closure 4, the latter being fed in the direction of the arrow of FIG. 1 in synchronism with the film, there is a stationary guide means 6 formed by a pair of stationary heat-resistant plates 7 and 71 made, for example, of a material such as Bakelite. These plates 7 and 71 of the stationary guide means 6 are situated in a common plane and have inner edges which are spaced from and parallel to each other so that they define between themselves the gap 8 the size of which is sufficiently great to receive the tongue-and-groove projecting portions 131, 133 of the strips 121, 122 while the inner surfaces of these strips where they project beyond the gap 8 engage the outer surfaces of the coplanar plates 7 and 71 of the stationary guide means 6. These plates each have a thickness which is approximately equal to the distance between the inner faces of the fastener strips when the fastener is in its closed position.

In order to hold the plates 7 and 71 they are mounted at their end regions on a pair of holding means. The upper holding means of FIG. 1 is shown in detail in FIG. 2. This holding means 9 is composed of a pair of holding members 92 each of which is fixed to the plates 7 and 71 in the manner illustrated in FIG. 2. Thus the pair of holding strips 92 can be riveted to each other with rivets which pass through both these holding strips 92 and the plates 7 and 71 at the edge regions of the latter which are most distant from each other. According to one of the features of the invention the members 92 of the holding means 9 are bridged away from the outer surfaces of the plates 7 and 71 to define with the latter the free spaces 111 through which the strips of the sliderless fastener 4 can freely pass in the manner shown in FIG. 2. It is apparent, therefore, that with the apparatus as described thus far the tube of film 1 will be continuously cut by the cutting means 2 and the sliderless fastener 4 will be continuously fed first between the plate portions 21 and 22 of the cutting means and then through the spaces 111 along the plates 7 and 71 with the tongue-and-groove fastener portions accommodated in the gap 8 so that the closure strips themselves can slide against the outer surfaces of the plates 7 and 71 of the guide means 6. As may be seen from FIG. 4, during the heat-sealing operations the strips are pressed at their inner faces against the outer faces of the plate 71 without applying any compressive forces to the tongue-and-groove projections 131, 132 so that in this way these projections are isolated from the pressure forces applied during heat-sealing.

Distant from the holding means 9, the guide plates 7 and 71 are held in predetermined positions with respect to each other by a holding means 10 referred to in greater detail below and shown in FIG. 4. However, before reaching the holding means 10 the sliderless fastener 4 and the edge regions 11 and 12 of the plastic film 1 are joined by heat-sealing. Thus, as is schematically illustrated in FIG. 3, the portions of the edge regions 11 and 12 which overlap the outer faces of the strips 121 and 122 are heat-sealed to the latter under heat and pressure through conventional components 14 and 141 which are provided for this purpose. Either the fastener 4 and the film 1 are fed in a stepwise manner through a given increment, with the heat-sealing jaws 14 and 141 having a length corresponding to this increment so as to provide a continuous fastening of the film at its edges 11 and 12 to the strips 121, 122 or these components 14 and 141 for applying heat and pressure to seal the plastic film to the closure can be in the form of rollers which can contact the continuously moving film 1 and fastener 4 so as to provide a continuous heat-sealing thereto. It is to be noted that with the apparatus of the invention the joining of the closure 4 to the film 1 which forms the container, at the mouth of the latter, takes place while the strips 121 and 122 are fastened together with the closure in its closed condition, so that as a result in the completed product the strips 121 and 122 cannot fail to have the proper position with respect to each other.

The holding means 10 takes the form of a pair of parallel metal strips 101 and 102 which are fastened in any suitable way to the guide plates 7 and 71 at the end regions thereof distant from the holding means 9, and it will be noted from FIG. 4 that these members 101 and 102 of the holding means 10 extend transversely across the plates 7 and 71 contacting the latter through their entire width. These members 101 and 102 may also be riveted to each other with the guide plates 7 and 71 situated therebetween as illustrated in FIG. 4.

By the time the closure strips 121, 122 and the edge regions 11 and 12 of the film 1 reach the holding means 10, these edge regions have already been heat-sealed to the closure strips so that the latter can be freely pulled apart from each other to enable the work material to pass around the holding means 10 in the manner shown in FIG. 4.

In order to complete the container the work material is cut transversely to provide the edges 15 illustrated in FIG. 6. The transverse cutting takes place not only in the plastic film 1 but also across the thermoplastic closure 4. This transverse cutting is carried out in any conventional manner as by cutting blades which move together with the work material through a given stroke while cutting takes place, in a well known manner, or in the case where the work material moves in a stepwise manner the cutting can take place during those intervals when the work material is stationary. Because the transverse cuts are made in work material which is fed longitudinally from a source which is not previously cut in any way, it is possible to provide the final container with any desired width such as that shown in FIG. 6. After the transverse cutting takes place the resulting side edges 15 are heat-sealed to each other to provide the container shown in FIG. 6. The mouth of this container of course can be closed by the closure 4 when the sliderless fastener is in its closed condition, and at any time the strips of the closure can be pulled apart from each other to give access to the interior of the container which is shown in FIG. 6.

The embodiment of FIGS. 7–14 has a handle facilitating carrying of the container.

In this case the tube of plastic film 1 is fed also downwardly toward the cutting means 2, as viewed in FIG. 7, and this cutting means is identical with the cutting means 2 referred to above. With this embodiment, however, a means is situated in advance of the cutting means for folding the film 1 inwardly prior to cutting thereof by cutting means 2. For this purpose a folding means is provided in the form of a rotary folding member 16 supported for free rotary movement at its center by a pivot 17 carried by any suitable stationary bracket. The rotary folding disc 16 engages the tubular film 1 at the periphery of the disc 16. The film 1 will initially have a configuration as shown in FIG. 8 where the one-piece tube is folded in fairly flat condition so as to terminate at its right in the edge 11' integrally connecting the flat walls of the one-piece thermoplastic tube 1. As this tube advances from the extruder or the like the edge or periphery of the folding member 16 engages the edge 11' to fold the latter inwardly in the manner shown in FIG. 9, thus providing the tube 1 at the region of the cutter 2 with the inwardly folded layers shown in FIG. 9. These layers have inner edges integral with each other at inner edge 11' while these inner layers are integrally joined to the outer layers at the outer edges of the inner layers apparent from FIG. 9.

It is to be noted that the folding means 16 places the inner edge 11' of FIG. 9 at a proper location to be acted upon by the cutting edge of the cutting means 2 so that as the work material progresses beyond the cutting means 2 it will have the condition illustrated in FIG. 10. Simultaneously, as was described above with the first embodiment, the sliderless fastener 4 is fed between the spaced wall portions of the cutting means 2, in the manner shown in FIG. 10 where the gap 5 between the walls 21 and 22 of FIG. 5 is illustrated. This sliderless fastener 4 is initially fed alongside the folding means 16 in the manner shown at the upper part of FIG. 7 and in FIG. 9.

The guide plates 7, 71 of the stationary guide means of this embodiment and the holding means 9 and 10 therefor are identical with the corresponding elements of FIGS. 1–4, so that these components are not further described. The strips 121 and 122 are received by the guide plates in precisely the same manner described above, and the cut film 1 is guided along the plates in the manner which is apparent from FIGS. 11 and 12. The inward folding of the plastic film 1 provides the double-thickness wall portions 13 and 14 which extend outwardly beyond the strips 121 and 122 in the manner apparent from FIGS. 11 and 12. Between the pair of holding means 9 and 10 the heat-sealing components 14 and 141 will act on the work to fasten the film to the outer surfaces of the strips 121 and 122 in the manner shown in FIGS. 12 and 13.

Thus, it will be noted that with this embodiment the inner free edges which define the mouth of the completed container are formed by inner walls 11'' and 12 which are heat-sealed to the exterior of the strips 121 and 122 with the outer walls which define the loops of double-thickness handle portions 13 and 14 also heat-sealed to the inner walls and of course to the outer surfaces of the strips 121 and 122. As a result the structure apparent from FIGS. 12 and 13 is provided.

This structure is also transversely cut at preselected intervals in any suitable known way to provide the container of FIG. 14 with the opposed side edges 15 and 151 which are heat-sealed to each other to complete the container in the manner described above.

Beyond the sliderless fastener 4 the double-thickness film portions 13 and 14 can be slotted with a U-shaped slot 18 as shown in FIG. 14, so that in this way the operator can displace the film at the slotted region 18 to derive a convenient handle by means of which the entire container can easily be carried about.

Except for these differences the embodiment of FIGS. 7–14 is the same as that of FIGS. 1–6.

Of course, the double-thickness of the portions 13 and 14 provide the added strength which is required for the carrying of the container and the contents thereof. The U-shaped slot 18 which is cut through all four layers of the loops 13 and 14 is situated midway between the opposed side edges of the container. It will be noted that with the embodiment of FIGS. 7–14 the closure 4 is also joined to the plastic film in its closed condition so that proper positioning of the strips with respect to each other is assured. Furthermore since the sliderless fastener 4 is manufactured in a manner completely separate from the film 1, in both embodiments, there is no particular restriction on the size of the film because of this separate production of the closure. The joining together of the closure with the film does not restrict the particular size of the latter.

As was pointed out above, the bottom of the container is exceedingly strong because it is unnecessary to heat-seal the walls of the container to each other at the bottom end of the container, and of course this advantage is retained with the embodiment of FIGS. 7–14.

What is claimed is:

1. In an apparatus for manufacturing a container from thermoplastic film with the container having at its mouth a thermoplastic closure formed by a sliderless fastener having a pair of strips provided with inner faces directed toward each other and carrying projecting tongue-and-groove portions extending longitudinally along said inner faces and when secured together to close the fastener situating said inner faces at a given distance from each other, a pair of elongated heat-resistant guide plates having a thickness approximately equal to said given distance, located in a common plane, and respectively having directed toward but spaced from each other a pair of edges which are parallel to each other and define an elongated gap for longitudinally receiving the projecting portions at the inner faces of the strips while the inner faces of the strips extend laterally beyond said gap and engage outer faces of said plates, and heat-sealing means directed toward the outer faces of at least one of said plates for heat-sealing to said strips at surfaces thereof directed away from said plates edge portions of a plastic film which subsequently form the mouth of the container, so that the tongue-and-groove projections can engage each other for holding the fastener strips in the closed condition of the fastener during joining of the film to the strips while the strips are pressed at their inner faces against the outer surfaces of said one plate during heat-sealing without influencing the engagement between the tongue-and-groove projections.

2. The combination of claim 1 and wherein a holding means is operatively connected with said plates at the region of one of their ends for holding the plates together with said edges parallel to each other for defining said gap, said holding means including a pair of holding members between which said plates are located with each member fixed to said plates at the outer surfaces thereof and bridged away from said outer surfaces at the region of said gap sufficiently to provide between said members and the outer surfaces of said plates spaces sufficiently great to provide for free longitudinal movement of the strips therethrough.

3. The combination of claim 2 and wherein a second holding means is fixed to said plates at ends thereof distant from the first-mentioned holding means with said second holding means extending along said plates next to the outer surfaces thereof, so that the strips are separated from each other to extend around the second holding means, the sealing means being situated between the pair of holding means.

4. The combination of claim 1 and wherein a cutting means is situated adjacent and in advance of the plates for cutting a sheet of film to provide the film edge portions which are joined to the strips, said cutting means having in the region of the common plane of said plates a cutting edge for cutting the film and beyond the cutting edge between the latter and the plates a pair of wall portions respectively situated on opposite sides of said plane and defining between themselves a space through which the strips are guided to the gap between said plates.

5. The combination of claim 4 and wherein a folding member is situated in the region of said plane in advance of said cutting means as the film travels toward the latter for folding the film inwardly to provide a pair of inner film layers between outer layers of the film with the inner layers joined to each other at an inner edge where the cutting means cuts the film and joined to the outer layers at outer edges of the inner layers, respectively, so that the heat-sealing means will seal to the strips film of double-thickness.

6. The combination of claim 5 and wherein said folding member is in the form of a disc situated in the same plane as said plates and supported for rotary movement.

* * * * *